(No Model.)
F. W. HUESTIS.
PNEUMATIC TIRE.
No. 498,794. Patented June 6, 1893.
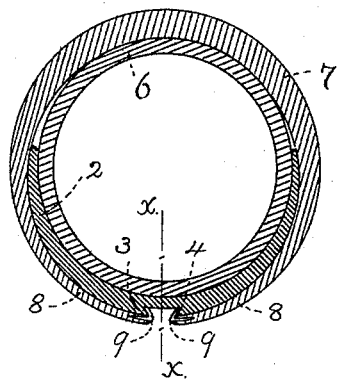
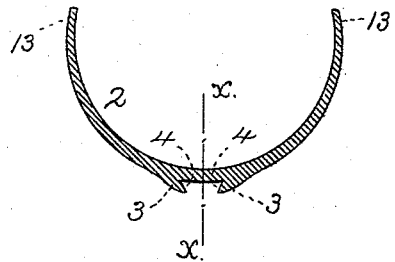
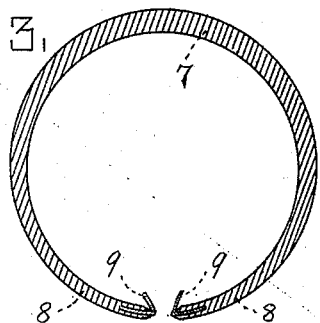
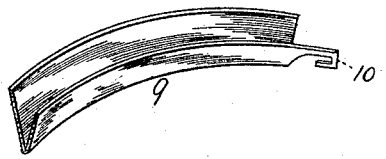
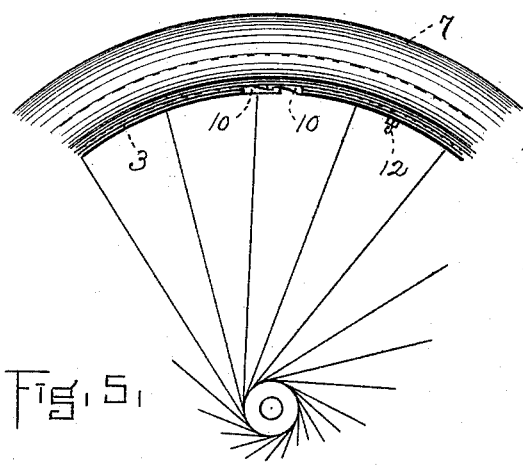
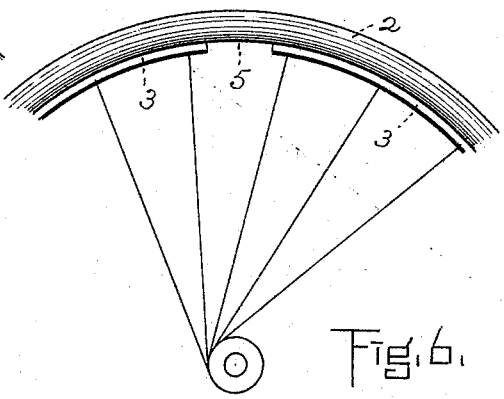
Witnesses.
Francis C. Stanwood
Geo. F. Wood
Inventor:
Fred'k W. Huestis.
by H. E. Lodge Atty

UNITED STATES PATENT OFFICE.

FREDERICK W. HUESTIS, OF BOSTON, ASSIGNOR TO GEORGE E. CRAFTS, OF NEWTON, MASSACHUSETTS.

PNEUMATIC TIRE.

SPECIFICATION forming part of Letters Patent No. 498,794, dated June 6, 1893.

Application filed January 28, 1893. Serial No. 459,938. (No model.)

*To all whom it may concern:*

Be it known that I, FREDERICK W. HUESTIS, a citizen of the United States, residing at West Roxbury, Boston, in the county of Suffolk and State of Massachusetts, have invented certain new and useful Improvements in Pneumatic Tires for Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to bicycles and particularly that class provided with pneumatic tires.

My invention consists in improvements in the construction and general arrangement of the tire, as likewise in the peculiar and novel features embodied in the rim, also in the cover for the air-tight tube.

One purpose of my invention is to provide for a ready and inexpensive method of uniting the rim and the cover in order to retain the air-tight tube in place and further to enable the latter to be easily removed,—likewise to create such an arrangement as to allow the full elasticity of the tire to be exercised.

Other minor details and novel characteristics will be hereinafter fully set forth and described.

The drawings represent in Figure 1. a vertical cross section of a pneumatic tire for a bicycle embodying my invention. Fig. 2 is a similar view of a rim also containing my improvements. Fig. 3 is a cross-section of the cover. Fig. 4 is a perspective view of a fragmentary portion of one of the split holding rings. Fig. 5 is a side elevation of a pneumatic tired wheel under my invention. Fig. 6 is a similar view of the rim without the air-tight tube and cover.

In bicycles of the class above premised the tire is composed generally of a metallic rim grooved or semi-circular in cross section, together with an elastic air-tight tube, the latter being adapted to fit in part within the groove of the rim or to inclose the latter, and in part to extend therebeyond, and so form the bearing surface of the tire taken as an entirety.

In my invention I have shown a rim at 2 as composed of a circular metallic ring preferably semi-tubular in cross-section with the concave portion upon the outside. This rim is preferably thickest at the center, if viewed in cross-section, and tapers toward the edges in order that it may combine strength and rigidity with lightness, the latter being a very essential requisite. Upon the inside of said rim I have formed two parallel lips 3 3 which overhang as shown in Fig. 1. forming undercut grooves 4 4 on either side of a line X. X. coincident with the general plane of the wheel and adjacent to said plane. On one portion of the rim, shown at 5, these lips are omitted for purposes subsequently explained.

In order to protect the air-tight rubber tube 6, which is contained within the hollow exterior part of the rim, and to increase its life by preventing it from contact with the ground, I provide a cover 7. This consists of a flexible tube of canvas or rubber, preferably the latter, split longitudinally and thickest at its middle portion where the greatest wear ensues, while it diminishes transversely toward the edges 8. 8. These latter are furnished with split rings 9. 9. of steel or other tough spring metal and are preferably V or hook shape in cross-section, generally approximating in form to that of the lips 3 formed or attached to the rim. In lieu of the undercut grooves, ribs may be employed as equivalents, and the rings 9. 9. engage in them. These split rings 9 are attached to the cover 7 longitudinally along each side edge by vulcanizing the rubber composing the cover, or they may be secured mechanically in any other desired manner. The contiguous ends of said rings terminate in hooks 10, 10 oppositely disposed in order to interlock and prevent them from spreading or enlarging when pressure is created by inflation of the air-tube. Said rings are to be made of sufficient size to allow them to be easily slipped over the lips 3.

The mode of constructing and completing the tire is as follows: The rim in shape and cross-section as shown and forming a part of a bicycle wheel, is provided with an endless rubber air-tight tube 6. capable of expansion by means of a valve 12. Said tube is laid in the hollow groove in the rim, preferably when in a partially empty or collapsed condition. When so positioned the cover is laid upon it and the edges 8. 8. each furnished with the ring 9, as before described, are now drawn down over and beneath the rim, until said rings engage in the undercut grooves 4 4, created by the lips 3. When this act is accomplished the ends are interlocked; such union occurs at a point 5 on the rim, where the lips are omitted. In this way the engagement of the ring-ends can be easily made, while the contiguous ends of the cover preferably adapted to overlap are now fastened with rubber cement or by any other method which serves to produce a smooth joint. After these several acts have been effected inflation of the air-tube is in order, and as the air is forcibly introduced expansion occurs; the size of the ring is increased thereby outwardly at all points, since the rim resists any tendency to compression. As a consequence the exterior cover 7 is likewise expanded, while the rings 9. 9. are pulled forcibly against the lips 3: hence while the air-tight tube is distended all the several elements composing the tire are held together as a unit.

One of the peculiar and novel features obtained by my invention, and one of great importance consists in the fact that the cover is attached to the rim at two points only and these are in close proximity and upon the inside of the rim. Hence it will be seen that the full elasticity of the cover is obtained, while the resiliency of the inflated tube is permitted without impediment. This will be better understood by referring to the tire in cross-section, and as shown in Fig. 1, where it is evident that the cover from the edge of one lip 3 entirely around to the edge of the opposite and co-operating lip 3 has no attachment whatsoever to the tire, but simply overlaps and is supported by the latter. Hence the full elasticity of the pneumatic portion of the tire is obtained, and as a result the machine rides very much easier, than if the cover was attached firmly to the extreme outer edge portions 13 of the rim.

What I claim is—

1. As a new article of manufacture, a circular rim for bicyle wheels, semi-tubular in cross-section to serve as a bed for the air-tube and having the concave portion outwardly disposed, and with parallel undercut lips formed upon the inner convex portion of said rim along a median line circumferentially of the rim, substantially as and for purposes explained.

2. In bicycles a semi-tubular rim forming part of a wheel provided with undercut grooves circumferentially upon each side of a median line drawn on the inner periphery of said rim, and an air-tight tube adapted to be contained within the outer concave periphery or the rim, combined with a flexible cover adapted to be drawn over about the rim, and separable metallic rings affixed longitudinally upon the side edges of the cover and arranged to engage the rim along a median line on the inner periphery of said rim, substantially as and for purposes stated.

In testimony whereof I affix my signature in presence of two witnesses.

FREDERICK W. HUESTIS.

Witnesses:
 MELVILLE A. HARRIS,
 ZEB A. DYER.